United States Patent [19]
Wiedner et al.

[11] Patent Number: 5,335,372
[45] Date of Patent: Aug. 9, 1994

[54] ARTICLE OF CLOTHING, IN PARTICULAR FOR THE MEDICAL OR CHEMICAL FIELD

[75] Inventors: Guenther Wiedner, Seeshaupt, Fed. Rep. of Germany; John A. Duncan, Glenrothes; Suresh R. Patel, Dalgety Bay, both of Scotland

[73] Assignee: Rotecno AG, Zurich, Switzerland

[21] Appl. No.: 864,839

[22] Filed: Apr. 7, 1992

[51] Int. Cl.⁵ .................................... A41D 13/08
[52] U.S. Cl. .......................................... 2/16; 2/2; 2/2.5; 2/243.1; 2/272; 2/87; 2/125
[58] Field of Search ............... 2/16, DIG. 7, 2.5, 114, 2/243, 272, 95, 125, 87, 83, 82, 105, 106, 243 R, DIG. 2, 2, 51, 243.1

[56] References Cited

U.S. PATENT DOCUMENTS

| | | | |
|---|---|---|---|
| 3,868,728 | 3/1975 | Krzewinski | 2/114 |
| 4,136,222 | 1/1979 | Jonnes | 2/272 |
| 4,316,456 | 2/1982 | Stoneback . | |
| 4,344,999 | 8/1982 | Gohlke | 2/DIG. 7 |
| 4,504,977 | 3/1985 | King et al. | 2/51 |
| 4,504,978 | 3/1985 | Gregory | 2/114 |
| 4,555,811 | 12/1985 | Shimalla | 2/51 |
| 4,586,196 | 5/1986 | White | 2/114 |
| 4,736,467 | 4/1988 | Schwarze et al. | 2/114 |
| 4,752,972 | 6/1988 | Neckerman et al. . | |
| 4,860,386 | 8/1989 | Martin | 2/272 |
| 4,961,985 | 10/1990 | Henn et al. | 2/DIG. 7 |
| 5,003,902 | 4/1991 | Benstock et al. . | |
| 5,017,424 | 5/1991 | Farnworth et al. | 2/243 A |
| 5,027,438 | 7/1991 | Schwarze et al. | 2/114 |

FOREIGN PATENT DOCUMENTS

| | | | |
|---|---|---|---|
| 653304 | 11/1937 | Fed. Rep. of Germany | 2/243 R |
| 8103265 | 1/1981 | PCT Int'l Appl. | 2/DIG. 7 |
| 9000643 | 1/1990 | PCT Int'l Appl. | 2/DIG. 7 |
| 2101469 | 1/1983 | United Kingdom | 2/DIG. 7 |

Primary Examiner—Clifford D. Crowder
Assistant Examiner—Gloria Hale
Attorney, Agent, or Firm—Townsend and Townsend Khourie and Crew

[57] ABSTRACT

An article of clothing for protection against liquids and/or micro-organisms. The article includes a portion or portions each of which includes at least three layers, an inner, outer and intermediate layer, for example. The outer layer is formed of a tightly woven hydrophobic fabric which forms a liquid barrier and a micro-organism barrier. The inner layer also is formed of a material which likewise forms a liquid barrier and a micro-organism barrier and also is preferably hydrophobic. The intermediate layer separates the outer layer and the inner layer in a region of a portion of the article and prevents direct contact between the inner and outer layers in that region.

18 Claims, 3 Drawing Sheets

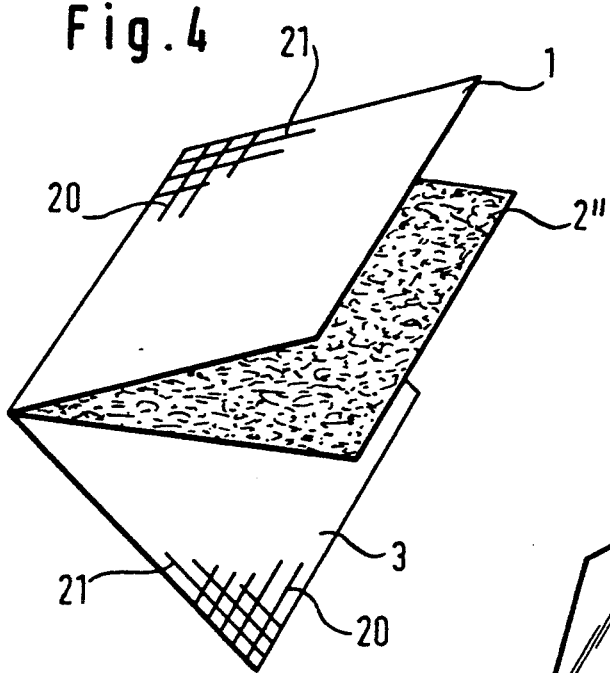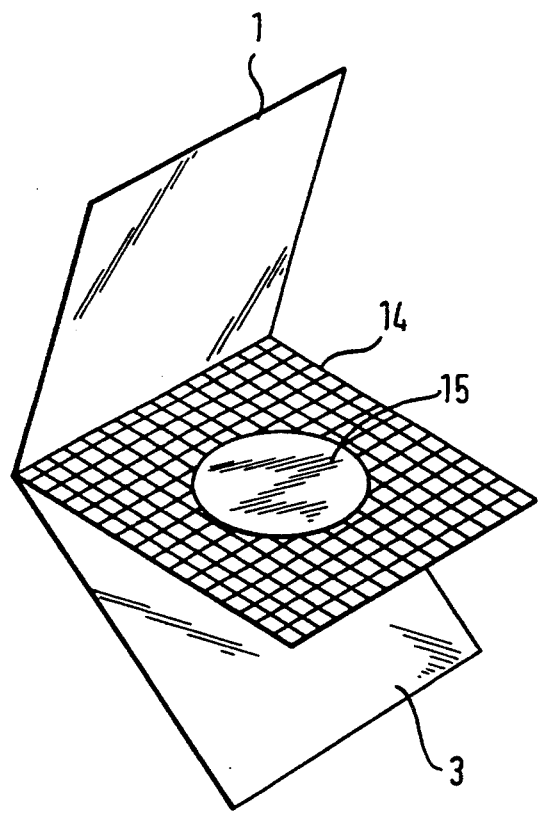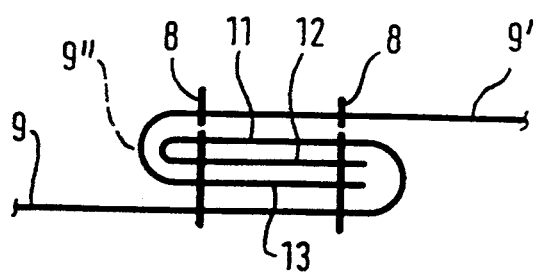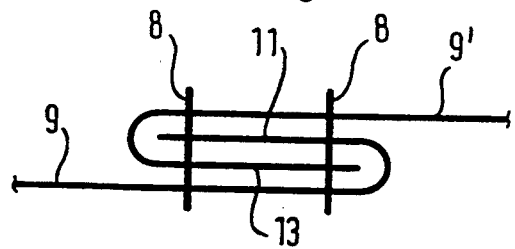

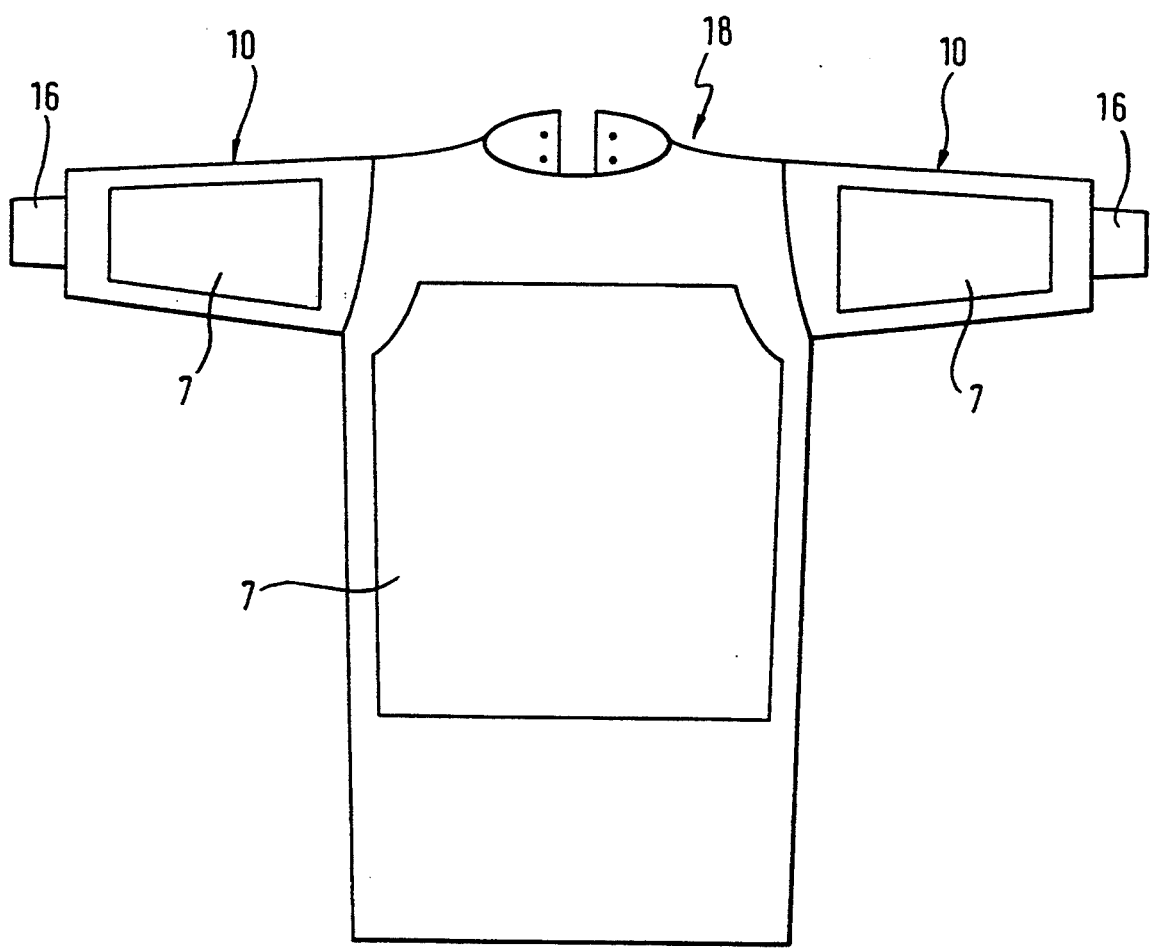

ARTICLE OF CLOTHING, IN PARTICULAR FOR THE MEDICAL OR CHEMICAL FIELD

BACKGROUND OF THE INVENTION

The invention relates to an article of clothing, in particular for the medical or chemical field for protection against liquids and/or micro-organisms at least a portion of the article of clothing comprises at least three layers.

Articles of clothing which consist of at least three layers are known, for example from the field of sport. Such articles of clothing are entirely suitable for the intended uses and, for example, offer protection against rain and wind, but are nevertheless able to breath actively so that a requisite degree of comfort for the user is achieved. They are not, however, straightforwardly usable for some important specific applications in the medical and chemical fields, for example, because of restrictions on their ability to be sterilized.

SUMMARY OF THE INVENTION

It is required of such articles of clothing, which are preferably worn by people who are active in the medical or chemical fields, that they, on the one hand, offer a high level of comfort to the wearer even over a long period of time and, on the other hand, form a reliable barrier for substances such as liquids and micro-organisms, in particular bacteria.

It can sometimes happen that substances pass through these articles of clothing at particularly stressed positions, i.e., at critical positions or locations which enter into intensive contact with the substances, such as the blood of patients under applied pressure.

Thus the object underlying the present invention is to provide an article of clothing which is preferably usable in the medical or chemical field and which effectively prevents the passage of substances, in particular liquids such as blood, and micro-organisms, in particular bacteria, through the article of clothing over an adequately large period of time, without the article of clothing becoming uncomfortable to wear, and without the freedom of movement of the wearer being restricted. Not only gowns and overalls are regarded as articles of clothing within the sense of the invention but also shoes, gaiters, caps and the like.

This object is satisfied in an article of clothing of the initially named kind, in that an outer layer is formed of a tightly woven hydrophobic fabric which forms a liquid barrier and a micro-organism barrier; in that an inner layer comprises a material which likewise forms a liquid barrier and a microorganism barrier and is preferably likewise hydrophobic; and in that an intermediate layer separates the outer layer and the inner layer, at least at one critical position, and prevents a direct contact of these layers.

Since the article of clothing, which can for example be a surgical gown or an overall used by a medical rescue orderly, comprises at least three layers, at least in part, it is possible to increase the time which is required for liquid to pass fully through the article of clothing to a considerable degree, in particular at stressed positions. The first and outer layer, which stands in direct contact with the substance, for example a liquid or a liquid containing micro-organisms, consists of a hydrophobic material which is closely woven from endless filaments and thereby forms the main protection for the wearer as a result of its characteristics. It forms a barrier for bacteria and liquid. If a substance succeeds in passing through the first and outer layer of the article of clothing it will then encounter the intermediate layer. Passage of the substance, for example, a liquid, through the outer layer can be caused when the wearer of the article of clothing is in particularly pronounced contact with the substance. This can, for example, arise if the wearer is carrying out actions in the interior of a body during an operation. It can also arise if the outer layer of the article of clothing comes into contact with the substance under substantial pressure and over a longer period of time e.g., if a surgeon's elbow is resting on a liquid contaminated substrate.

Through this intermediate layer, which effectively prevents direct contact of the outer and inner layers it is ensured that further movement of the substance or the liquid in the direction of the inner layer is counteracted. As a result of the intermediate layer the substance is forced to select the path of least resistance and to re-distribute itself in the intermediate layer, i.e. in directions approximately perpendicular to the direction of penetration. If an intermediate layer were not present then the contact pressure would lead to a wetting of the outer and inner layers with the substance so this substance could relatively quickly penetrate both layers at the positions of contact.

The construction of the invention effectively prevents the passage of the substance through the entire fabric over a period of time which can be much more than twice the time required to penetrate only one layer.

Furthermore, the types of fabric used are capable of active breathing so that, for example, sweat given off by the wearer of the clothing can pass, in the form of water vapor, through the article of clothing into the environment, whereby condensation inside the clothing is effectively prevented and the comfort of the wearer is increased. The fact that the intermediate layer is only provided in critical regions of the article of clothing means that the remaining regions can be of lighter construction, whereby the comfort to the wearer is further increased.

Furthermore, the design of an article of clothing in accordance with the invention ensures that the freedom of movement of the wearer is not restricted. This is, for example, of great significance with regard to the scope of movement required for an operation which extends over a longer period of time.

For the purpose of pleasant and comfortable wearing of the article of clothing provision is made, in an advantageous embodiment, that the inner layer is of lighter design than the outer layer. This is also made possible by the fact that the inner layer, which does not come into direct contact with the environment, is subject to substantially less stress than the outer layer.

In a further advantageous embodiment the seams which are present for the various layers are preferably displaced relative to one another. In this way it is ensured that an easy path through the article of clothing is not offered to liquid or bacteria via the stitches of two seams which lie on top of one another. If a liquid should, for example, succeed in passing through the outer layer then it will encounter the intermediate layer and will only contact the inner layer at a later time, if at all. As the inner layer does not have a seam at this position its liquid and bacteria blocking characteristics come fully into play and prevent passage through the article of clothing. Furthermore, attention is preferably paid to the fact that the seams are not arranged in regions in which critical positions are defined. This embodiment takes account of the fact that the substances are hindered less in passing through the seam positions than they are in passing through the individual layers.

In a further advantageous embodiment the intermediate layer has a grid-like or net-like structure which is preferably woven and consists of nonabsorbent material. A substance which passes through the outer layer, for example, a liquid, can flow without great resistance in directions perpendicular to the penetration direction through interconnected receiving openings or volumes which are formed between the meshes, from one receiving opening to the next, for example, as a result of the applied contact pressure. The substance is thus distributed in the intermediate layer and stored in the receiving openings. After use the article of clothing is cleaned, with the substance being removed from the receiving openings. This succeeds despite the hydrophobic characteristics of the outer or inner layers because the surface tension of the washing liquid is set to a lower value during washing which makes wetting of the fabric possible.

In a further advantageous embodiment the intermediate layer consists of absorbent material, for example foam, but preferably of woven material with the fabric filaments being absorbent. The intermediate layer picks up the substance which passes through the outer layer. A further force must now be expended, additional to the force which is necessary to press the substance through the inner layer, in order to press the substance out of the intermediate layer. In this way the article of clothing as a whole becomes more impenetrable.

In accordance with a further advantageous embodiment the passage of substances through the article of clothing is fully prevented by an impermeable layer. However this layer, which can comprise foil, should not be provided throughout the entire article of clothing because otherwise a disadvantage arises that the article of clothing is no longer capable of breathing.

The impermeable layer can preferably be provided in addition to the net-like or absorbent intermediate layer at particularly critical positions, for example in the elbow region, to ensure that the penetration of substances at the critical positions is effectively prevented, without having to completely line the entire article of clothing with an impermeable layer. The net-like or absorbent intermediate layer thereby also provides take-up capacity for the liquid which penetrates the outer layer.

In a further advantageous embodiment a carrier layer is arranged between the outer and inner layers and is preferably formed in a grid-like manner with relatively large grid spacing. An intermediate layer can be mounted onto this carrier layer at the particularly critical regions. The carrier layer can be present throughout the entire article of clothing because it is not particularly noticeable. In this arrangement it is of particular advantage that the carrier layer does not have to be secured at the critical positions. Thus, it is, for example, possible to apply an impermeable layer at a desired position without having to use seams at the critical positions, since the impermeable layer is carried at the critical position by the carrier layer.

Further advantageous embodiments are defined in the subordinate claims.

BRIEF DESCRIPTION OF THE DRAWINGS

FIG. 4 shows the schematic build-up of an article of clothing of the present invention with an absorbent intermediate layer, FIG. 5 shows the schematic build-up of an article of clothing of the present invention with a net-like intermediate layer and an additional impermeable material arrangement, FIG. 6 is a schematic sectional view of a seam according to the invention, FIG. 7 is a schematic sectional view of a further seam according to the invention, and FIG. 8 is a schematic illustration of a surgeon's gown or smock in accordance with the invention.

DESCRIPTION OF THE PREFERRED EMBODIMENT

The use of the invention is not restricted to the following embodiments which are set forth purely by way of example.

Figure 1:
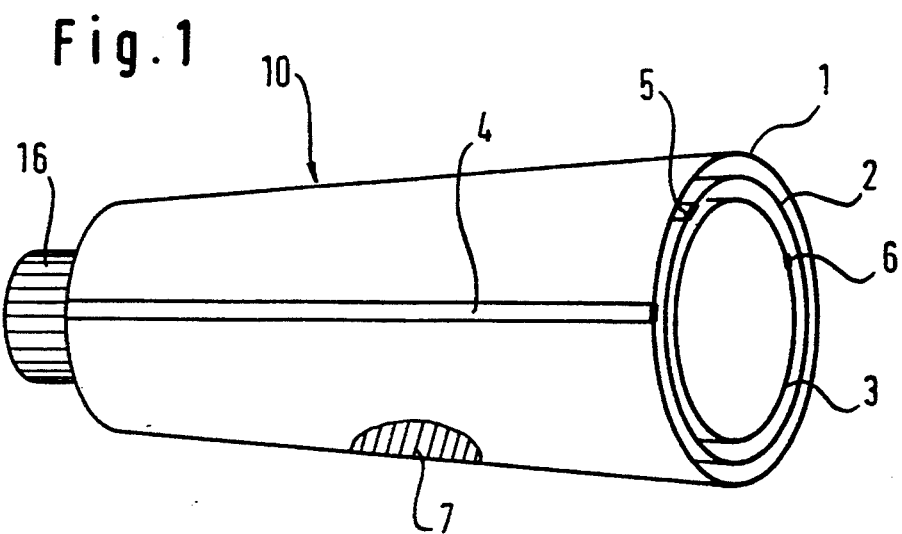
FIG. 1 is a sectional view of an arm or sleeve of an article of clothing constructed in accordance with the invention.

In FIG. 1 there is shown sleeve 10 of an article of clothing which is built-up of an outer layer or ply 1, an intermediate layer or ply 2 and an inner layer or ply 3.

The outer layer 1 consists in this example of a construction of microfibers (microfibers are fibers under 1 dTex) which has more than 12,000 individual filaments per cm². For example, in one direction (warp or weft direction) 60 threads per cm are provided each having 144 individual filaments. The filaments can, for example, consist of polyester and are treated to render them hydrophobic using conventional textile technology. In order to prevent an electrostatic charge, continuous conductive threads 20, 21 are preferably woven-in crosswise at short intervals of, for example, 5 mm in both the inner layer 1 and the outer layer 3 (see FIG. 4). In this way electrostatic spark discharge and the attraction of lint, fluff and dust is prevented, which is particularly important when working under the cleanest conditions and in the vicinity of sensitive measurement instruments.

The inner layer 3 can be identical with the outer layer 1 or can also have a less dense structure.

The intermediate layer 2 which is provided between the outer layer 1 and the inner layer 3 prevents direct contact between these two layers 1 and 3 so that on contact with the substance under pressure this substance cannot be simultaneously pressed through the two layers.

Figure 2:
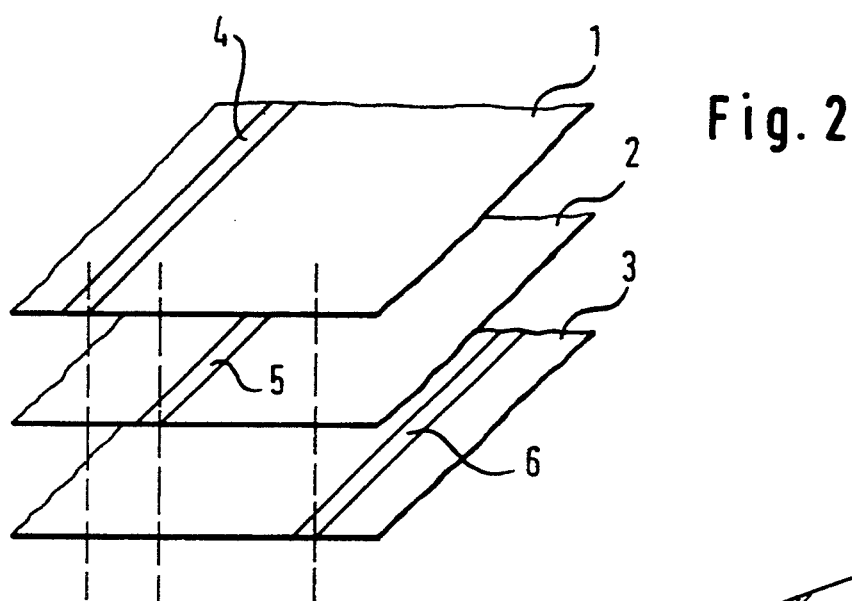
FIG. 2 is a partial section of an exploded view of a section of an article of clothing according to the present invention, such as the article of clothing illustrated in FIG. 1.

The seam 4 of the outer layer 1, the seam 5 of the intermediate layer 5 and the seam 6 of the inner layer are, as is particularly emphasized in FIG. 2, mutually displaced so that they do not come into direct or indirect contact with one another and are not arranged in a critical region 7.

A resilient cuff 16, preferably a double cuff, is provided as the termination of the sleeve part 10 and adapts in form-fitting manner to the corresponding arm region of the wearer. In the operating theater this cuff is covered over by a glove.

The intermediate layer 2 can be made in different embodiments. In accordance with FIG. 3, which shows a schematic build-up of an article of clothing, the outer layer 1 and the inner layer 3 are formed as in FIG. 1. The intermediate layer 2 consists, for example, of a grid-like material 2' which has interconnected receiving volumes (volumina or openings 17) between the meshes and consists of a nonabsorbent material. The openings which are located between individual meshes of the grid-like or net-like structure 2' are smaller than 3 mm and preferably are smaller than 1.5 mm. The liquid which is forced in through the outer layer can thus flow from one receiving volume to the next and thus distributes itself in the intermediate layer 2. In this arrangement, the size of the mesh intervals of the pick-up volumes 17 is preferably designed so that the outer layer 1 and the inner layer 3 cannot enter into contact with one another through these openings 17.

Figure 3:
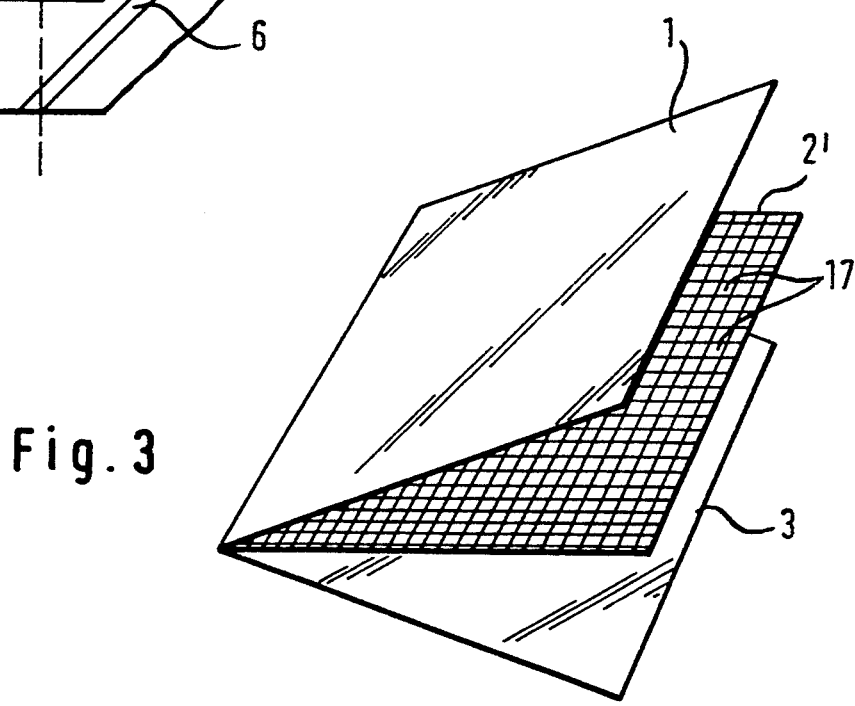
FIG. 3 shows the schematic build-up of an article of clothing of the present invention with a net-like intermediate layer.

FIG. 4 shows an embodiment as in FIG. 3, however the intermediate layer 2 consists of an absorbent material 2". By way of example the material can be woven of polyester filaments which each consist of a plurality of filaments. In this way a capillary action is generated by the small spacings between the individual filaments and this capillary action brings about a strongly absorbent effect. This effect can be increased in accordance with the invention by treating the fabric to render it hydrophilic.

The use of the same type of chemical materials in all the layers 1, 2, 3 (in the above embodiment in the form of polyester) has the particular advantage that the shrinkage of the various layers 1, 2 and 3 and their behavior when sterilized are similar.

Furthermore, pick-up volumes are always formed in a woven fabric so that a substance which has penetrated through the outer layer can also be picked up by these volumes with an appropriate design of the fabric.

In accordance with FIG. 5, which likewise shows the schematic build-up of an article of clothing, the article of clothing consists of an outer ply 1, a carrier layer 14 and an inner ply 3. An impermeable material 15 is additionally provided on the carrier layer 14. The carrier layer has a grid-like structure and the material 15 can be provided in the form of a liquid-tight foil or membrane which is applied to a particularly critical location 7 of the article of clothing.

In accordance with FIG. 8 a smock-like article of clothing 18 is shown in which the critical positions or locations 7 are defined in the arm parts 10 and in the breast region.

Examples of seams are shown in FIGS. 6 and 7 with the reference numeral 8 characterizing the stitches and reference numerals 9 and 9' defining the materials to be connected. In accordance with FIG. 6, the end of the material part 9' is folded back whereby the material part 9' and the folded back end 13 of the material part 9' form a pocket. The end of the material part 9 is folded over twice, so that this material part 9 consists of three plies 9, 11 and 12 at its edge. Two plies 11 and 12 are introduced into the above-described pocket so that the plies lie on top of one another in the sequence 9', 11, 12, 13 and 9 and are doubly sewn together at 8' and 8". The embodiment of FIG. 7 represents a simplified embodiment in comparison to FIG. 6 because the end of the material part 9 is only folded over once. Thus at the seam location only four layers of the material lie on top of one another.

Embodiments of seams are also known in which the stitching threads do not fully penetrate the entire seam. Thus, in FIG. 6 for example, the seam can be so modified that before sewing it together the part of the material 9" is folded upwardly and thus only the parts 9, 13, 12 and 11 are sewn together. If the material part 9" is then folded over the seam then the seam is not accessible from the outside.

I claim:

1. An article of clothing comprising a portion having an inner, outer and intermediate layer, said inner and outer layers comprising hydrophobic fabric, said intermediate layer separating the inner and outer layers in a region of said portion and preventing contact between the inner and outer layers in said region, said inner and outer layers each having a seam, said seams being spaced from one another so that they do not overlie one another.

2. The article of claim 1 wherein said seams are positioned such that overlap of the seams is prevented when said portion is maintained unfolded.

3. The article of claim 1 wherein the inner layer is less dense than the outer layer.

4. The article of claim 1 wherein the intermediate layer has a seam, the seams of the outer layer, intermediate layer and inner layer are spaced from one another to prevent contact therebetween.

5. The article of claim 1 wherein the intermediate layer essentially consists of an absorbent material.

6. The article of claim 1 wherein the intermediate layer essentially consists of an impermeable material.

7. The article of claim 6 wherein the impermeable material comprises foil.

8. The article of claim 1 wherein the intermediate layer has a grid-like structure.

9. The article of claim 8 wherein the grid-like structure includes openings which are located between individual meshes of the grid-like structure and are smaller than 3 mm.

10. The article of claim 8 wherein the intermediate layer includes interconnected collecting volumes for picking-up liquid that penetrates the outer layer.

11. The article of claim 8 wherein the grid-like intermediate layer essentially consists of non-absorbent material.

12. The article of claim 8 wherein the intermediate layer is woven.

13. The article of claim 8 wherein the grid-like structure openings are smaller than 1.5 mm.

14. An article of clothing comprising a portion having an inner, outer and intermediate layer, said inner and outer layers comprising hydrophobic fabric, said intermediate layer separating the inner and outer layers in a region of said portion and preventing contact between the inner and outer layers in said region, said inner and outer layers each having a seam, said seams being spaced from one another so that they do not overlie one another and said seams being arranged outside said region.

15. The article of claim 14 wherein said seams are positioned such that overlap of the seams is prevented when said portion is maintained unfolded.

16. An article of clothing comprising a portion having an inner, outer and intermediate layer, said inner and outer layers comprising hydrophobic fabric, said intermediate layer separating the inner and outer layers in a region of said portion and preventing contact between the inner and outer layers in said region, said portion further including a net-like carrier that is arranged between the inner and outer layers and carries the intermediate layer in said region.

17. The article of claim 16 wherein said portion of clothing extends beyond said region, said carrier extends beyond said region and said intermediate layer is confined to said region.

18. The article of claim 17 wherein said carrier extends substantially throughout the entire article of clothing.

* * * * *